United States Patent
Watanabe et al.

(10) Patent No.: US 6,514,455 B1
(45) Date of Patent: Feb. 4, 2003

(54) HEATING APPARATUS OF A WORKPIECE OF DISTORTED SHAPE, AND A QUENCHING APPARATUS FOR SIMULTANEOUS OPERATION OF MULTIPLE CAMS AND A QUENCHING METHOD FOR THE SAME

(75) Inventors: Hiyoshi Watanabe, Yao (JP); Tatemi Nakamura, Fujiidera (JP)

(73) Assignee: Fuji Electronics Industry Co., Ltd., Osaka (JP)

( * ) Notice: Subject to any disclaimer, the term of this patent is extended or adjusted under 35 U.S.C. 154(b) by 0 days.

(21) Appl. No.: 09/709,157

(22) Filed: Nov. 9, 2000

(30) Foreign Application Priority Data

| Nov. 10, 1999 | (JP) | ............................................. 11-319879 |
| Nov. 10, 1999 | (JP) | ............................................. 11-319880 |
| Jan. 28, 2000 | (JP) | ........................................ 2000-020417 |

(51) Int. Cl.$^7$ ............................................. C21D 1/06
(52) U.S. Cl. ......................... 266/252; 266/44; 266/92; 219/652; 219/639
(58) Field of Search ......................... 266/92, 249, 252, 266/44; 219/639, 652

(56) References Cited

U.S. PATENT DOCUMENTS

| 6,077,475 A | * | 6/2000 | Hanisch et al. | ............... 266/252 |
| 6,153,865 A | * | 11/2000 | Storm et al. | ................. 219/639 |
| 6,259,076 B1 | * | 7/2001 | Gezarzick et al. | .......... 219/639 |

* cited by examiner

Primary Examiner—Scott Kastler
(74) Attorney, Agent, or Firm—Kilyk & Bowersox, P.L.L.C.

(57) ABSTRACT

Rotation of a plate cam arranged at almost the center position of a semi-open coil is performed by a motor, and induction heating of the periphery of the plate cam is performed by the semi-open coil during the rotation. The process results in uniform heating of the periphery of a workpiece of distorted shape. A detector of an angle of rotation to detect an angle of rotation of the plate cam and an electric power control part to control the electric power to be supplied to the semi-open coil according to the detection results of the detector of an angle of rotation, are provided so that the most outer end at the farthest position from the center of the plate cam is not excessively heated. A process is also provided.

12 Claims, 16 Drawing Sheets

(C)

(B)

(A)

(A)

(B)

(A)  (B)

(C)

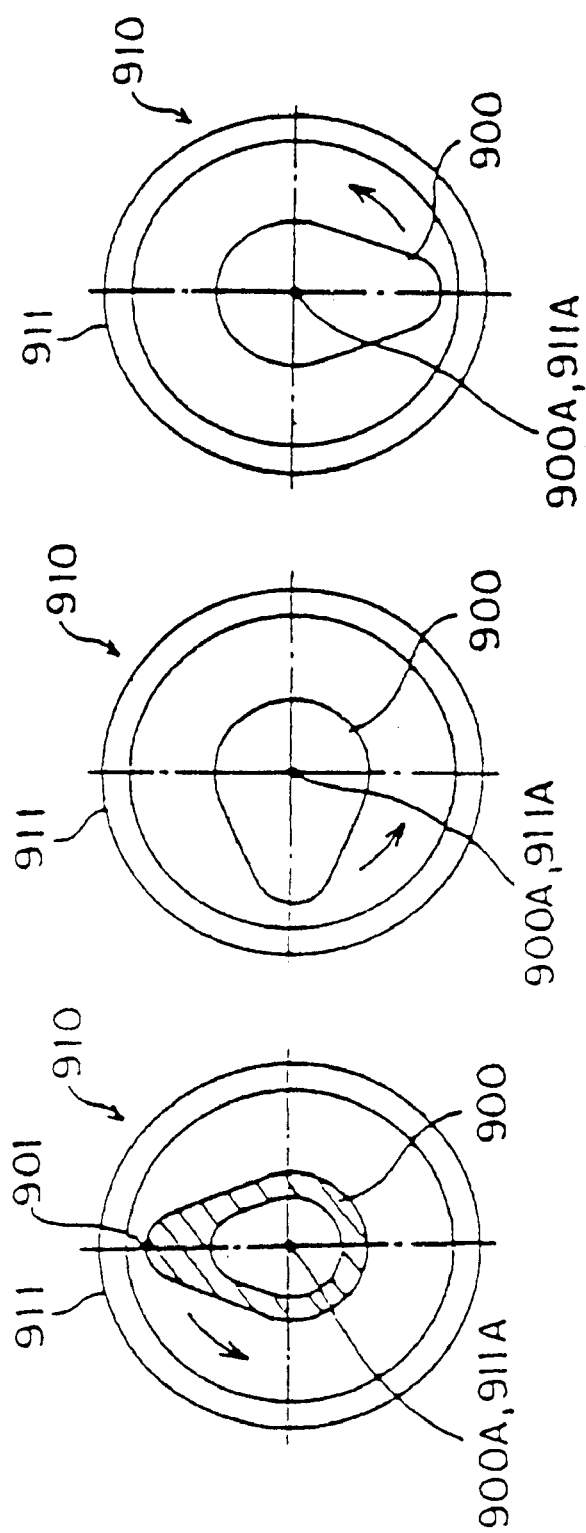

HEATING APPARATUS OF A WORKPIECE OF DISTORTED SHAPE, AND A QUENCHING APPARATUS FOR SIMULTANEOUS OPERATION OF MULTIPLE CAMS AND A QUENCHING METHOD FOR THE SAME

Heating apparatus of a workpiece of distorted shape, and a quenching apparatus for simultaneous operation of multiple cams and a quenching method for the same

BACKGROUND OF THE INVENTION

1. Field of the Invention

The present invention relates to a heating apparatus for a workpiece of distorted shape used for a high-frequency heating apparatus and so on to perform uniform high-frequency heating of the periphery of the plate cam and so on, and to a quenching apparatus for simultaneous operation of multiple cams and a quenching method for the same to simultaneously heat peripheries of a set of cams with each different phase formed at a camshaft.

2. Description of the Prior Art

A typical high-frequency quenching apparatus for said apparatuses has performed heating by generating induced current on the periphery through supply of high-frequency electric current to a heating coil 910 from a transformer (not shown), while the cam 900 is rotated around a center 900A, in coincidence of a center 911A of a circular heating conductor 911 of a heating coil 910 heating the periphery of the cam 900 with a center 900A of the cam 900, as shown in FIG. 16. Such circumstances have been the same with camshafts formed with a set of cams with each different phase.

However, there is an essential disadvantage that a projecting part of the cam 900, that is, the most outer end 901 is suffered from concentrated induction heating, as it is in the closest vicinity to the heating conductor 911 of the heating coil 910, and, then, deeper quenching of it is performed, in comparison with that of other parts, as shown in FIG. 16(A). Especially, a heating coil 910, which has been used for all kinds of cams, has been used for high-frequency quenching, as a camshaft driving valves of an engine is formed with a set of cams with each different phase.

The above is not the best high-frequency quenching, and far from a solution for an essential disadvantage of concentrated heating of the most outer end 901.

Though there may be caused distortion, or quenching crack by ununiform heating, when deeper quenching of the most outer end 901 of the cam 900, than that of other parts, is performed, the above is not a problem proper to cams as a workpiece, but it is safe to say that the above is a common one to workpieces of distorted shape. And it has been pointed out that the problem is not only with high-frequency induction heating, but also with general resistance heating.

The present invention has been made under such circumstances. The object of the invention is to offer a heating apparatus for a workpiece of distorted shape to perform uniform heating of the periphery of the workpiece of distorted shape. Moreover, another object is to offer a quenching apparatus for simultaneous operation of multiple cams and a quenching method for the same to perform most suitable high-frequency quenching of each cam, without concentrated heating of each cam at the most outer end, even in the case of a camshaft formed with a set of cams with each different phase.

SUMMARY OF THE INVENTION

A heating apparatus of a workpiece of distorted shape according to the present invention performs relative rotation of a workpiece of distorted shape arranged at almost the center position of a heating coil and heats a periphery of the workpiece by the coil during the rotation, and is characterized in that it comprises a detector of an angle of rotation to detect a relative angle of rotation of the workpiece of distorted shape, and an electric power control part to control electric power to be supplied to the heating coil according to the detection results of the detector of an angle of rotation so that the most outer end at the most farthest position from the center of the workpiece of distorted shape are not excessively heated in comparison with other parts.

In such configuration, the electric power to be supplied to the heating coil is minimized, in the case of a state where the most outer end of the workpiece of distorted shape may be excessively heated by the heating coil, when the workpiece of distorted shape arranged at almost the center position of the heating coil is relatively rotated, and, as a result, the most outer end of the workpiece of distorted shape is not excessively heated.

If a relative angle of rotation of the workpiece of distorted shape is within a predetermined range around a standard angle as a center. The electric power control part may be preferably configured to minimize the electric power to be supplied to the heating coil, when the heating coil is a semiopen type coil, and a relative angle of rotation of the workpiece of distorted shape is assumed to be the standard angle, in a state where the most outer end of the workpiece of distorted shape is facing with the semiopen type coil and located on the perpendicular line passing through the center of the coil.

Moreover, if a relative angle of rotation of the workpiece of distorted shape is within a predetermined range around the standard angle as a center, the electric power control part may be preferably configured to minimize the electric power to be supplied to the heating coil, when the heating coil is a potbelly type coil with a configuration in which a semicircular small-diameter coil part is facing with a semicircular small-diameter coil part each other and they are jointed together, and a relative angle of rotation of the workpiece of distorted shape is assumed to be the standard angle, in a state where the most outer end of the workpiece of distorted shape is facing with the semicircular small-diameter coil part and located on the perpendicular line passing through the center of the coil part.

Another heating apparatus of workpiece of distorted shape according to the present invention has a basic configuration to perform rotation of a workpiece of distorted shape arranged at almost the center position of a circular coil and to heat a periphery of the workpiece by the coil during the rotation, and is characterized in that it comprises a motion mechanism to perform revolution of the workpiece of distorted shape around the circular coil or revolution of the circular coil around the workpiece of distorted shape, in a state where the center of the circular coil and that of the workpiece of distorted shape are deviated from each other, so that the periphery of the workpiece of distorted shape is uniformly heated.

In the case of such configuration, the distance between the periphery of the workpiece of distorted shape and the circular coil becomes uniform all over the periphery of the workpiece of distorted shape, and as a result, the periphery of the workpiece of distorted shape is uniformly heated by the circular coil, as the workpiece of distorted shape is rotated, and, at the same time, performs relative revolution to the circular coil.

When a workpiece of distorted shape is a plate cam, the radius r of the revolution of the plate cam or the circular coil may be preferably configured to be r≈(r1−r2)/2, when the workpiece of distorted shape is a plate cam, the distance between the most outer end in the most farthest position from the center of the plate cam and the center of the plate cam is assumed to be r1, and the distance between the other most outer end on the extension of the straight line connecting the both and the center of the plate cam to be r2.

A quenching apparatus for simultaneous operation of multiple cams according to the present invention is a quenching apparatus for simultaneous operation of multiple cams to perform simultaneous high-frequency quenching of peripheries of a plurality of kinds of cams with each different phase formed at a camshaft. And it has a configuration where a heating conductor to heat the peripheries of the cams comprises: a plurality of circular heating coils; transformers to supply electric current to the heating coils; a driving mechanism to perform revolution of the heating coils around the cams in a state where the centers of the heating conductors of the heating coils and those of the cams are deviated from each other; and a cooling mechanism to cool the heated cams, and electric currents are supplied from the same transformers to the heating coils with the same phase.

And, the radius r of the revolution of the heating coils may be preferably configured to be r≈(r1−r2)/2, when the distance between the most outer end in the most farthest position from the center of the cam and the center of the cam is assumed to be r1, and the distance between the other most outer end on the extension of the straight line connecting the both and the center of the cam to be r2.

A quenching method for simultaneous operation of multiple cams according to the present invention performs simultaneous heating of peripheries of a plurality of kinds of cams with each different phase formed at a camshaft, and heating conductors to heat the peripheries of the cams perform revolution motion of the heating coils around the cam in a state where the centers of the heating conductors of a plurality of circular heating coils are deviated from the centers of the cams each other, and electric currents are supplied from the same transformers to the heating coils with the same phase to heat the cams.

Moreover, the radius r of the revolution of the heating coils may be preferably configured to be r≈(r1−r2)/2, when the distance between the most outer end in the farthest position from the center of the cam and the center of the cam is assumed to be r1, and the distance between the other most outer end on the extension of the straight line connecting the both and the center of the cam to be r2.

BRIEF DESCRIPTION OF DRAWING

FIG. 11(A) shows a schematic front view, and FIG. 11(B) a schematic side view.

FIG. 14(A) shows a schematic front view of the camshaft, FIG. 14(B) a schematic side view of it, FIG. 14(C) a schematic configuration of the quenching apparatus for simultaneous operation of multiple cams.

FIG. 15(A) shows a schematic front view of the camshaft, FIG. 15(B) a schematic side view of it, FIG. 15(C) a schematic configuration of the quenching apparatus for simultaneous operation of multiple cams.

FIGS. 16A–C show a schematic view of motions of the plate cam heated by a typical high-frequency heating apparatus in a conventional heating apparatus of a workpiece of distorted shape.

DESCRIPTION OF REFERENCE NUMERALS

Figure 1:
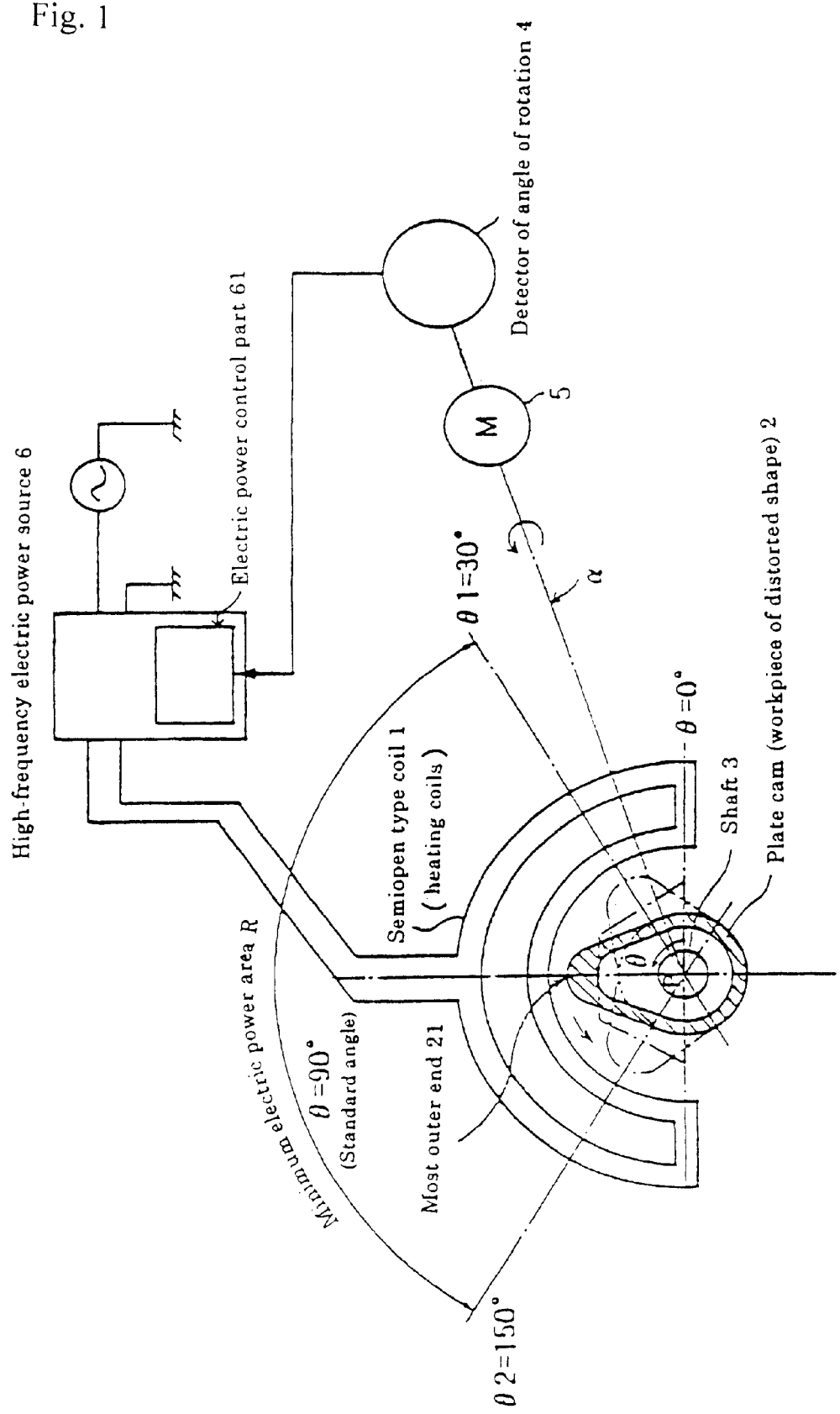
FIG. 1 shows a schematic configuration of a heating apparatus of a workpiece of distorted shape according to a first embodiment according to the present invention.

1 Semiopen type coil (heating coil)
2 Plate cam (workpiece of distorted shape) 21Most outer end
4 Detector of an angle of rotation
5 Electric power control part
1' Circular coil
2 Plate cam (workpiece of distorted shape)
21 Most outer end
4' Motion mechanism
P Center of plate cam
Q Center of circular coil
100 Tempering apparatus for simultaneous operation of multiple cams 110 Heating coil for intake side
111 Heating conductor (of a heating coil for intake side)
120 Heating coil for exhaust side
121 Heating conductor (of heating coil for exhaust side)
130 Transformer for intake side
140 Transformer for exhaust side
WA Camshaft
WA1 Cam for intake side
WA2 Cam for exhaust side
W0 Centers of cam for intake side, cam for exhaust side, and camshaft

DETAILED DESCRIPTION OF THE INVENTION

Figure 2:
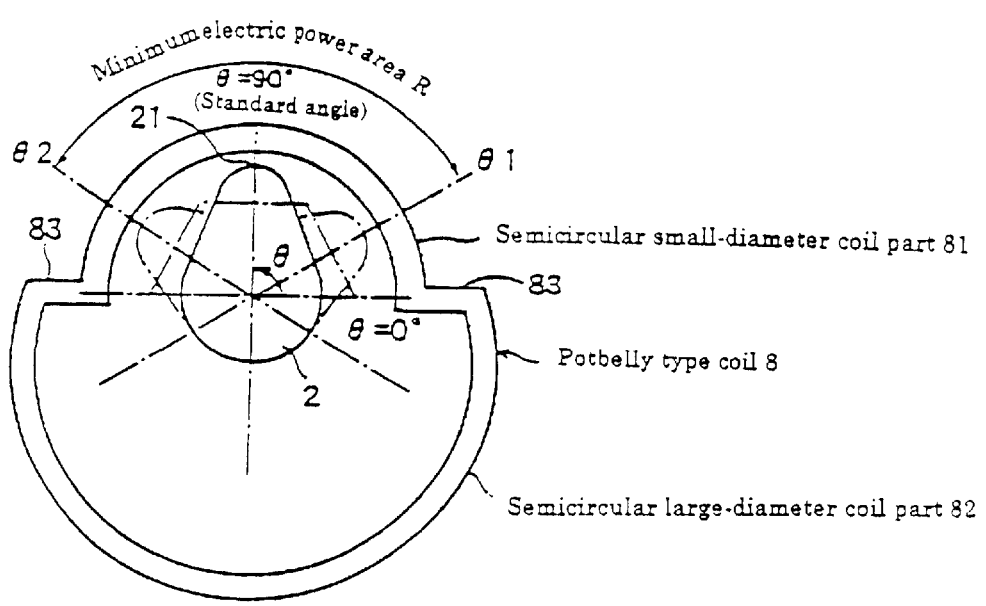
FIG. 2 shows a schematic view of a variation of the heating coil of the apparatus shown in FIG. 1

A heating apparatus of workpieces of distorted shape according to a embodiment of the present invention will be described below, referring to FIG. 1 and FIG. 2. The heating apparatus is a high-frequency heating apparatus of workpieces of distorted shape, and has a basic configuration as shown in FIG. 1, where a plate cam 2 (corresponding to e workpiece of distorted shape) arranged at almost the center position of a semiopen type coil 1 (corresponding to a heating coil) is rotated by a motor 5, and the semiopen type coil 1 performs induction heating of the periphery on the plate cam 2 for quenching, during the rotation. The most outstanding feature is that it comprises a detector of angle of rotation 4 detecting angle of rotation of the plate cam 2, and an electric power control part controlling electric power to be supplied to the heating coil 1 according to the detection results of the detector of an angle of rotation 4, so that the most outer end 21 at the farthest position from the center of the plate cam 2 is not excessively heated in comparison with other parts. Hereinafter, details of each part will be described below.

Though a cooling jacket to perform water-cooling of the plate cam 2 after completion of quenching and so on is provided around the semiopen type coil 1, drawings for them are eliminated.

The plate cam 2 and a shafts 3 connected to it compose a crank shaft α of an engine. When the crank shaft α is fixed at a shaft supporting mechanism (not shown) and slightly moved, the plate cam 2 is displaced to the center position of the semiopen type coil 1, and the plate cam 2 and so on are configured to be rotated by a motor 5 in the state.

The semiopen type coil 1 is made by folding a hollow pipe of copper and so on. A high-frequency electric power source 7 and a water-cooling tank (not shown) are connected to the semiopen type coil 1. When large high-frequency electric current generated at the high-frequency electric power source is supplied to the semiopen type coil 1, a high-frequency magnetic field to perform induction heating of the plate cam 2 is generated, and, when water supplied from the water-cooling tank circulates in the semiopen type coil 1, Joule heat generated in the semiopen type coil 1 and so on are configured to be absorbed.

The detector of angle of rotation 4 is not always required to detect all range of angles of rotation θ of the plate cam 2, and only required to detect whether the angle is within the minimum electric power area R shown in the drawing. Thereby, an optoelectronic sensor and so on are used in the case. The detection results are sent to the electric power control part 61 as a digital signal.

The minimum electric power area R denotes an area of angle of rotation θ to make the electric power to be supplied to the semiopen type coil 1 during the rotation of the plate cam 2 minimum, and is configured to be set around the standard angle (θ=90 degrees). Here, it is set as an area between θ1=30 degrees and θ=150 degrees.

The standard angle used above denotes angle of rotation θ of the plate cam 2 in the state where the most outer end 21 of the plate 2 is facing with the semiopen type coil 1, and is located on the perpendicular line passing through the center P of the semiopen type coil 1. When the angle of rotation of the plate cam 2 is the standard angle, there is the highest calorific value per hour caused by the position with the semiopen type coil 1 around the most outer end 21 of the plate cam 2.

A high-frequency electric power source 6 having a basic configuration adjusts large high-frequency electric current to two levels after conversion of commercial alternate electric current to large high-frequency electric current, and changes the primary electric voltage of an electric current transformer according to the detection results of the detector of angle of rotation 4 through a combination of an inverter and the electric current transformer.

A part of the high-frequency electric power source 6 having a function to change electric power to be supplied to the semiopen type coil 1 according to the detection results of the detector of angle of rotation 4 is called as an electric power control part 61. Specifically, it is a switching relay, a semiconductor switch, and so on to switch the primary electric voltage of the electric current transformer according to the detection results of the detector of angle of rotation 4.

The electric power control part 61 has a configuration where, when the angle of rotation θ of the plate cam 2 is outside the minimum electric power area R, the electric power to be supplied to the semiopen type coil 1 is assumed to be a rated value, and on the other hand, when the angle of rotation θ of the plate cam 2 is within the minimum electric power area R, the electric power to be supplied is made a minimum value.

In the case of a quenching apparatus of a workpiece of distorted shape with such configuration, the electric power supplied to the semiopen type coil 1 is automatically minimized, when an angle of rotation θ of the plate cam 2 is within the minimum electric power area R during rotation of a plate cam 2 arranged at almost the center position of a semiopen type coil 1. Thereby, the most outer end 21 of the plate cam 2 is not excessively heated in comparison with other parts, and the periphery of plate cam 2 is uniformly heated by the semiopen type coil 1. A shaded part shown in FIG. 1 shows a hardened layer formed by the quenching. That is, the hardened layer of the most outer end 21 of the plate cam 2 becomes thinner, comparing with a conventional case shown in FIG. 3(A).

Moreover, as the minimum electric power area R approaches a point at which the electric power supplied to the semiopen type coil 1 is closely related with a pattern of the hardened layer formed on the periphery of the plate cam 2. Therefore, the range of the minimum electric power area R is preferably configured to be freely set. In such a case, the electric power control part 61 may be changed to a configuration to freely change the range for the minimum electric power area R from the outside based on input from a detector of an angle of rotation 4 to detect a certain range.

Then, when a semiopen type coil 1 is used as a heating coil, there is a problem of low heating efficiency, as all the periphery of the plate cam 2 is not facing with the semiopen type coil 1, even by heating under rotation by a motor 5. In order to improve the above, a potbelly type of coil 8 shown in FIG. 2 may be used instead of the semiopen type coil 1

The potbelly type coil 8 has a configuration where a semicircular small-diameter coil part 81 and a semicircular large-diameter coil part 82 are facing each other, and jointed together by a straight line coil part 83. In the case, the coil type is different from that of the embodiment, but other parts are quite the same as those of the embodiment.

When the potbelly type coil 8 is used as the heating coil, there are advantages that the heating efficiency is high, and the time required for high-frequency heating may be reduced, as the periphery is heated, always facing with the semiopen type coil 1, during rotation of the plate cam 2.

When the angle of rotation θ of the plate cam 2 is outside the minimum electric power area R, the electric power to be supplied to the semiopen type coil 1 is set at a rated value. The most outer end 21 of the plate cam 2 faces the semicircular large-diameter coil part 82 for most of the duration. The distance between the most outer end 21 of the plate cam 2 and the semicircular large-diameter coil part 82 is larger than that of the semicircular small-diameter coil part 81. Therefore, there is no excessive heating of the most outer periphery 21 during rotation of the plate cam 2. Thereby, similar advantages may be obtained, to those with use of the semiopen type coil 1 as a heating coil.

Moreover, the heating apparatus for a workpiece of distorted shape according to the present invention is not limited to the embodiments. General type of resistance heating, instead of the high-frequency heating, may be used as a heating method of a workpiece of distorted shape. And, the heating coil may be rotated without rotation of the workpiece of distorted shape. Moreover, A type of the heating coil may be selected according to a kind of the workpiece. For example, in the case of an axial workpiece with a section of distorted shape, a circular coil according to the length of the workpiece may be used. The radius of the revolution motion of the heating coil may be properly determined. Any type of electric power control parts may be used, if they a configuration where the electric power to be supplied to the heating coil is controlled according to the detection results of the detector of an angle of rotation, so that the most outer end at the farthest position from the center of the workpiece of distorted shape is not excessively heated in comparison with other parts.

Then, a heating apparatus for a workpiece of distorted shape according to a second embodiment of the present invention will be described, referring to FIGS. 3 through 5. However, the relative dimensions between the plate cam and the heating coil are not exactly drawn in FIG. 3 for convenience.

Figure 3:
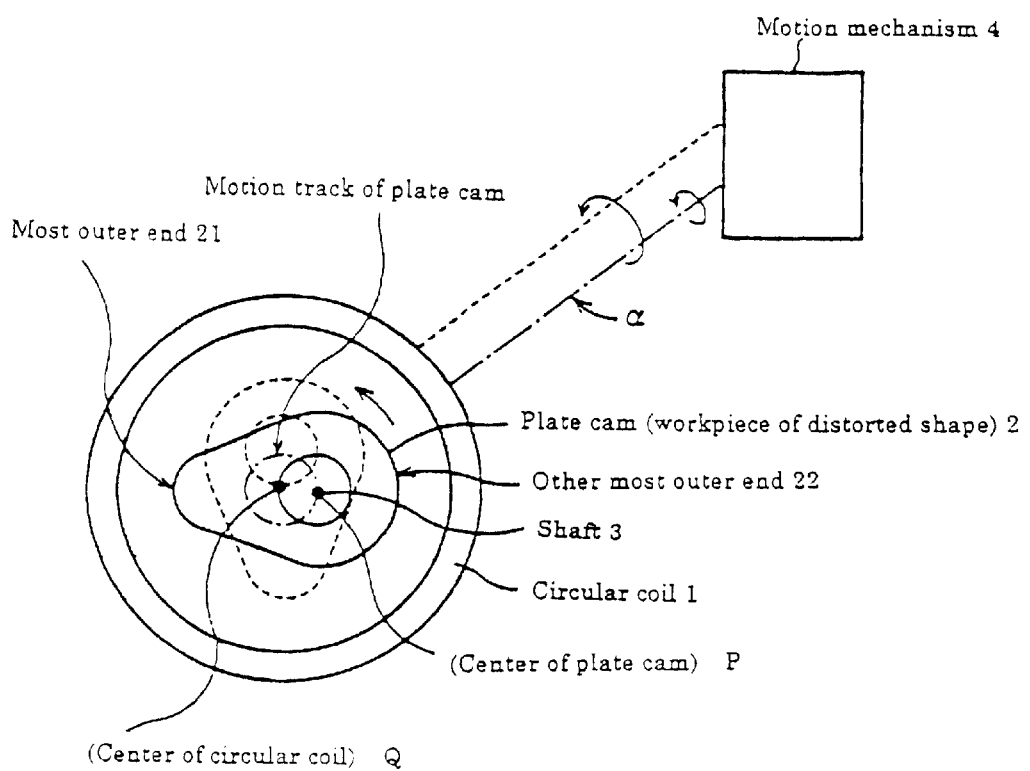
FIG. 3 shows a schematic configuration of a heating apparatus of a workpiece of distorted shape according to a second embodiment of the present invention.
Figure 4:
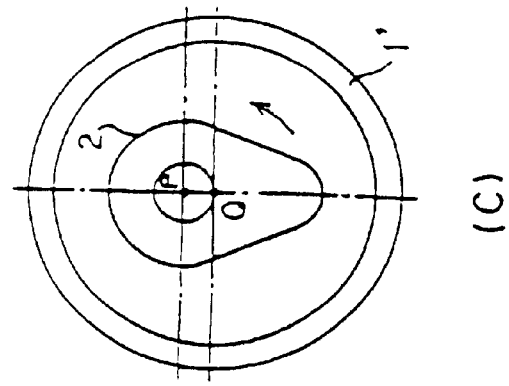
FIG. 4 shows a schematic view of motions of a plate cam heated by the apparatus shown in FIG. 3.
Figure 4:
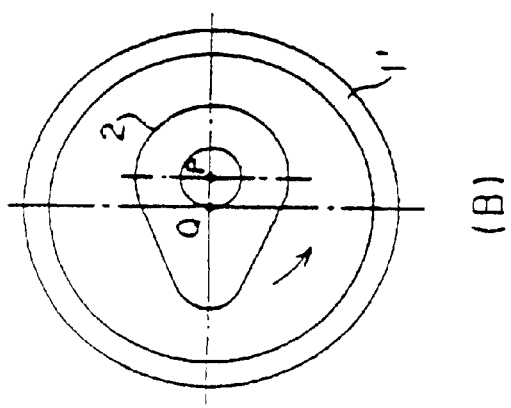
Figure 4:
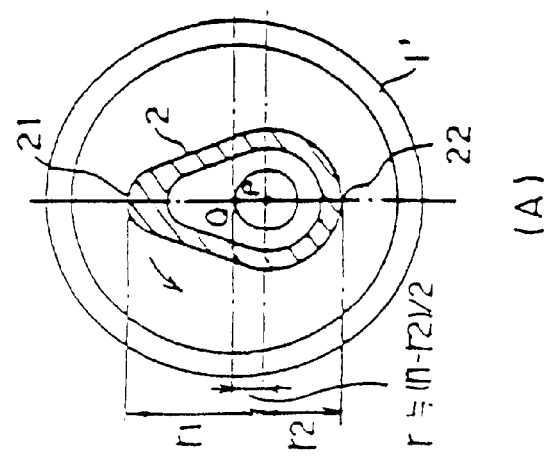

A high-frequency heating apparatus is used as the heating apparatus for a workpiece of distorted shape in the present example, and the apparatus has a basic configuration, shown in FIG. 3, where a plate cam 2 (corresponding to a workpiece of distorted shape) arranged at almost the center position of the circular coil 1 is rotated by a motor 5' (See FIG. 3) for rotation of a workpiece, and induction heating and quenching of the periphery of the plate cam 2 is performed by the circular coil 1' during the rotation. The most outstanding feature is that it comprises a motion mechanism 4 to perform revolution of the plate cam 2 around the center Q of the circular coil 1' in a state where the center Q of the circular coil 1' and that of the plate cam 2 are deviated from each other, so that the periphery of the plate cam 2 is uniformly heated. Moreover, a cooling jacket for water-cooling of the plate cam 2 after completion of quenching, and so on are provided around the circular coil 1', but it is not shown in the drawings.

The plate cam 2 as a workpiece of distorted shape is a component mounted in a crank shaft of an engine, here. The center P of the plate cam 2 is in coincidence with the shaft axis of the shaft 3. As shown in FIG. 2(A), the distance between the most outer end 21 at the farthest position from the center P of the plate cam 2 and the center P of the plate cam 2 is assumed to be r1, and the distance between the center P of the plate cam 2 and the other most outer end on the extension of the straight line connecting the most outer end and the center to be r2. Each component parts of the apparatus will be described below, referring to FIG. 3 and FIG. 5.

As shown in FIG. 3, the circular pipe is made by bending a hollow pipe of copper and so on to a circular form. The center Q of the circular coil 1' does never move, as it is a fixed type here. A high-frequency electric power source and a water-cooling tank (not shown) are connected to the circular coil 1'. When large high-frequency electric current generated at the high-frequency electric power source is supplied to the circular coil 1', a high-frequency magnetic field to perform induction heating of the plate cam 2 is generated, and, when water supplied from the water-cooling tank circulates in the circular coil 1', Joule heat generated in the circular coil 1' and so on are configured to be absorbed.

Figure 5:
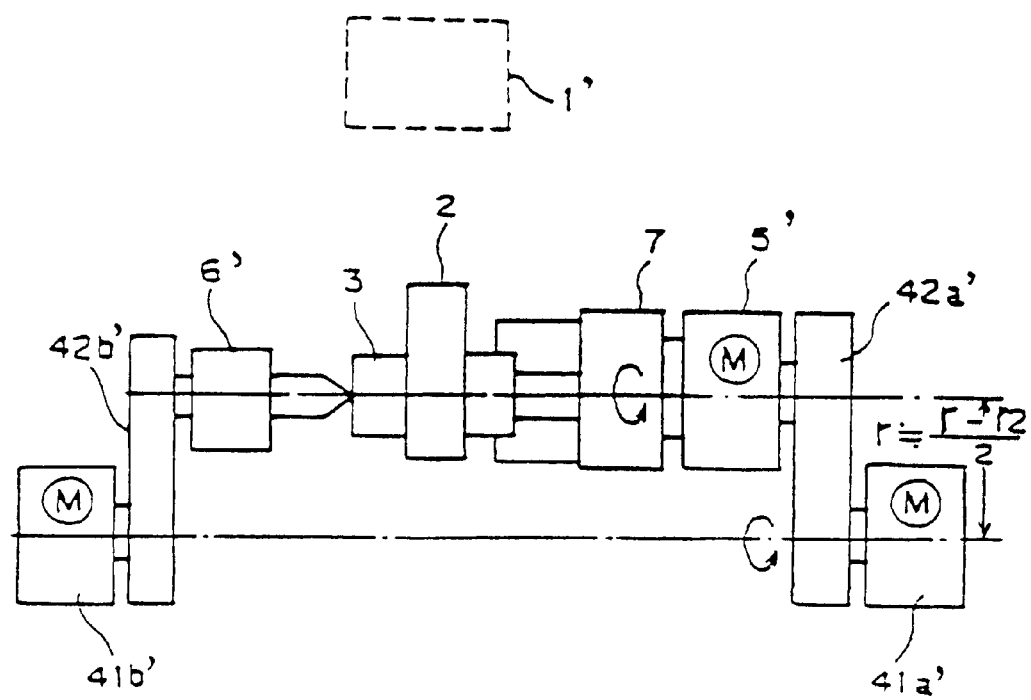
FIG. 5 shows a configuration of a motion mechanism of the apparatus shown in FIG. 3.
Figure 6:
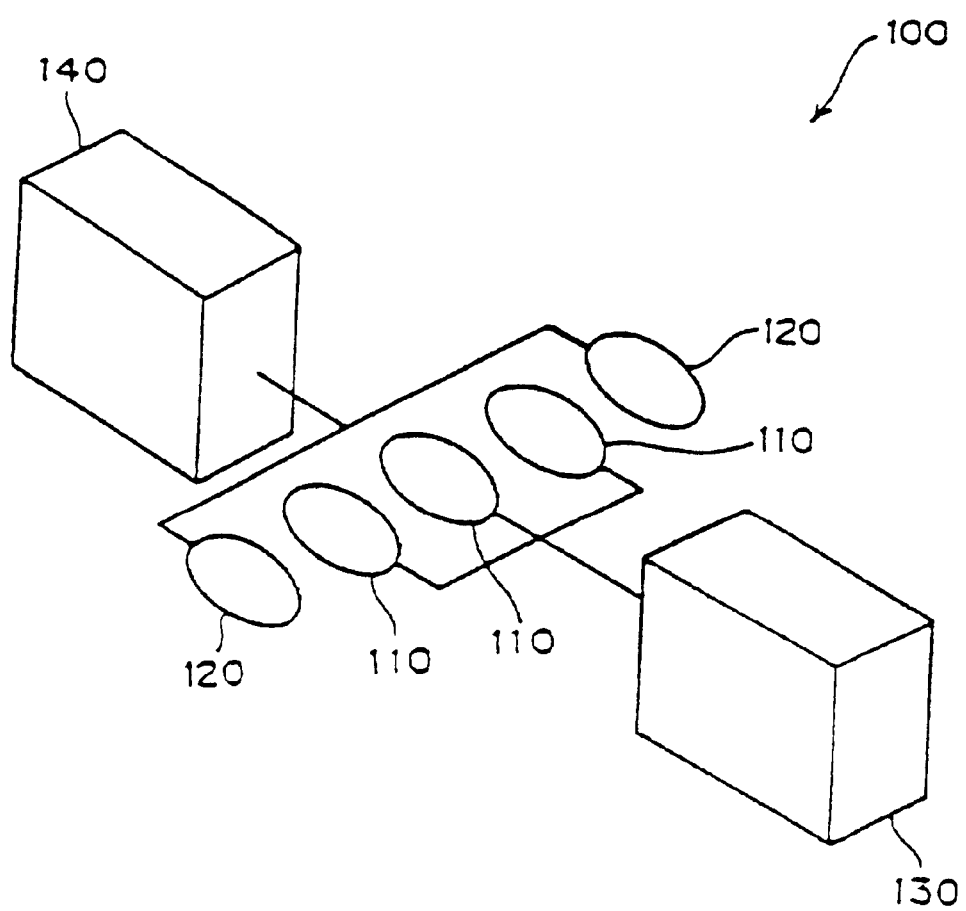
FIG. 6 shows a schematic view of a whole configuration of a quenching apparatus for simultaneous operation of multiple cams according to an embodiment of the present invention.
Figure 7:
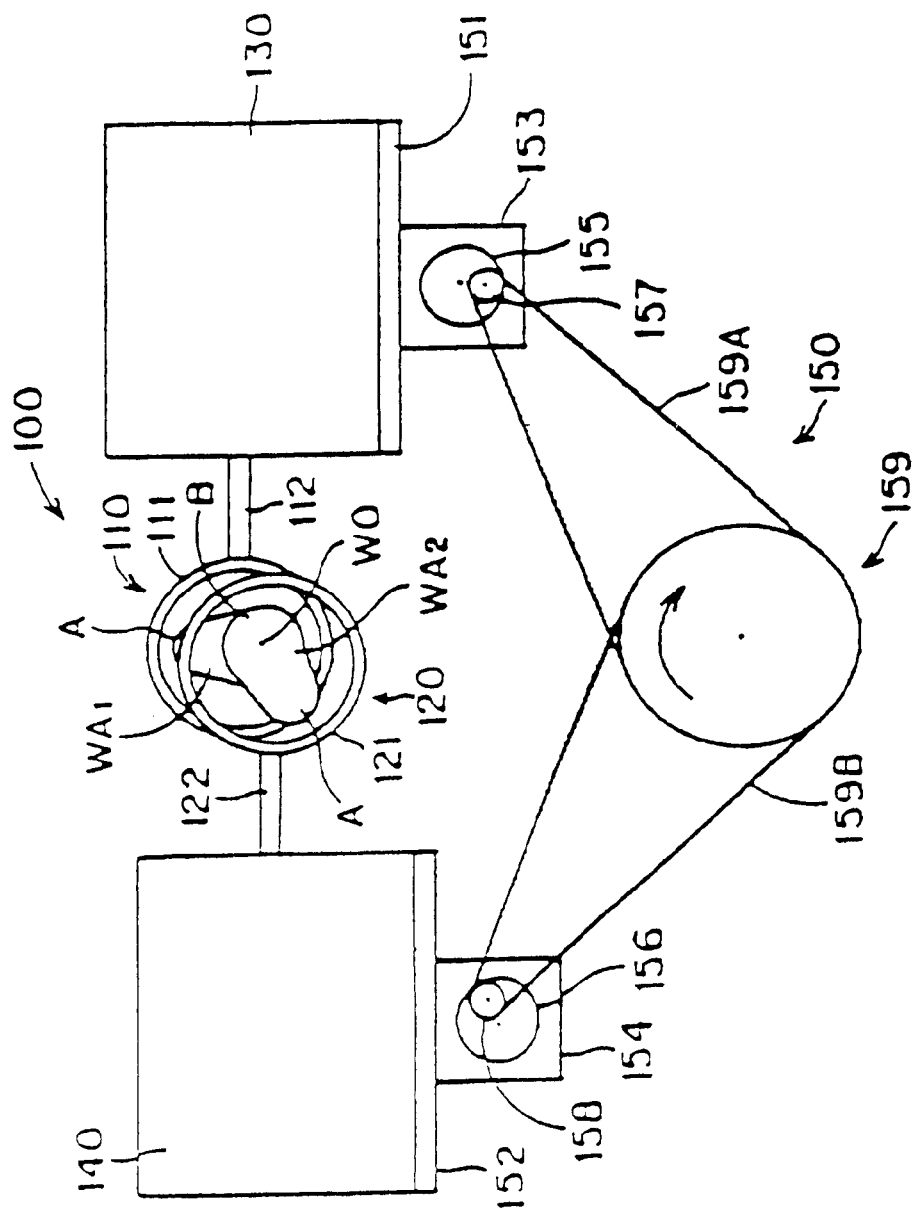
FIG. 7 shows a schematic side view of the quenching apparatus for simultaneous operation of multiple cams shown in FIG. 6.

As shown in FIG. 5, a motion mechanism 4' comprises revolution motors 41a' and 41b' facing each other, and arm parts 42a' and 42b' connected to the revolution motor 41a' and 41b'. As a basic configuration, a motor 5' for rotation of a workpiece is mounted at the tip of the arm part 42a', and a center 6 for shaft supporting of one end of the shaft 3 of the plate cam 2 is mounted at the tip of the arm part 42b'. And a chuck 7 holding the other end of the shaft 3 of the plate cam 2 is connected to the motor 5' for rotation of a workpiece. The shaft axis of the revolution motors 41a' and 41b' is in coincidence with the center Q of the circular coil 1'. The plate cam 2 is configured to be shaft-supported by the chuck 7 and the center 6. The revolution motor 41a' is configured to be freely movable in a direction of the shaft axis by a guide (not shown) in order to facilitate mounting and demounting of the plate cam 2 to the chuck 7 and so on.

The revolution motor 41a' is moved to the right side from the position shown in the drawing, and the plate cam 2 is gripped in the chuck 7. Thereafter, the position of the revolution motor 41a' is returned to the former position, and the end of the shaft 3 of the plate cam 2 abuts onto the center 76, wherein the plate cam 2 is located at almost the center of the circular coil 1'.

When the motor 5' for rotation of a workpiece is operated in the above, the circular coil 1' is rotated at almost the center position of the circular coil 1', and at the same time, the circular coil 1' performs revolution motion around the center Q of the circular coil 1', when the revolution motors 41a' and 41b' are operated. Here, the radius r of the revolution motion is configured to be as r≈(r1−r2)/2. However, the radius r of the revolution motion of the plate cam 2 is closely related with the pattern of the hardened layer formed on the periphery of the plate cam 2. Therefore, the radius r of the revolution motion of the plate cam 2 may be preferably adjusted by changing mounting positions of the motor for rotation of the workpiece 5', and the center 6 to the arm parts 42a', and 42b'.

In the case of a heating apparatus for a workpiece of distorted shape with a configuration mentioned above, the distance between the periphery of the plate cam 2 and the circular coil 1' becomes uniform all over the periphery of the plate cam 2, as the plate cam 2 arranged at almost the center position of the circular coil 1' performs revolution motion while rotating. Thereby, the periphery of the plate cam 2 may be uniformly heated, comparing with a conventional case. A shaded part shown in FIG. 4(A) denotes a hardened layer formed by quenching. That is, the thickness of the hardened layer of the most outer end 21 of the plate cam 2 is thinner than that of a conventional case shown in FIG. 16(A).

Though the plate cam 2 is used as a workpiece of distorted shape in the above, the motion mechanism 4 may be preferably changed at the design stage according to the form, dimensions, and so on of the workpiece, so that the revolution motion, in a circle, an ellipse, or near form to theses, of the workpiece of distorted shape, around the center Q of the circular coil 1', is performed, when the periphery of a workpiece of distorted shape having a different form from the above. That is, the similar results may be realized to the case using the plate cam 2, when revolution motion of the plate cam 2 is performed during rotation of the plate cam 2 so that the distance between the periphery and the circular coil 1 becomes uniform all over the periphery of the plate cam 2, The revolution motion of the circular coil 1' around the fixed center P of the plate cam 2 may be performed instead of the revolution motion of the plate cam 2. However, a state where the center Q of the circular coil 1' and that of the plate cam 2 are deviated each other is similarly required for revolution of the circular coil 1' to the embodiments.

A heating apparatus for a workpiece of distorted shape according to the present invention is not limited to the embodiment, and not only high-frequency heating but also general resistance heating may be used for the heating method of a workpiece of distorted shape. Moreover, a circular coil may be selected according to the kind of a workpiece of distorted shape. For example, the circular coil may be used for heating the periphery of an axial workpiece with a section of distorted shape according to the length of the workpiece. The radius of the revolution motion of the circular coil may be properly determined. Any motion mechanisms with a configuration where revolution motion of a workpiece of irregular or circular shape is possible may be used.

Then, embodiment of a quenching apparatus for simultaneous operation of multiple cams according to the present invention will be described below, referring to FIGS. 6 through 15. A camshaft WA with high-frequency quenching of two sets of cams, that is, a cam for the intake side WA1 and one for the exhaust side WA2, by the quenching apparatus for simultaneous operation of multiple cams 100, will be described, referring to FIG. 6, before description of a quenching apparatus for simultaneous operation of multiple cams according to the embodiment of the present invention.

The camshaft WA is provided with two kinds of cams with each different phase, that is, three cams for the intake side WA1 and two cams for the exhaust side WA2 arranged outside the cams for the intake side. And, the phase of the cam for the intake side WA1 is different from that of the cam for the exhaust side WA2 by 120 degrees. For example, the cams for the intake side WA1 are made by projecting a part of a circle with a radius of r1 toward the outside, and the distance between the most outer end A which is the most projecting part, and the center of the circle, that is, the center W0 of the cam for the intake side WA1 is assumed to be r2. Here, it is assumed that a position which is the farthest from the center W0 of the cam for the intake side WA1 is the most outer end A, and the other part located on the extension of the straight line connecting the most outer end A and the center of the cam for the intake side WA1 is the other most outer end. Moreover, both ends of the camshaft WA are provided with a journal WAJ. Each center W0 of the cams for the intake side WA1 and the one for the exhaust side WA2 is the same as the center W0 of the camshaft WA. Hereinafter, the center of the camshaft WA and the centers of both kinds of cams WA1 and WA2 are denoted by the same W0, as they are located at the same position.

The quenching apparatus for simultaneous operation of multiple cams 100 performs simultaneous high-frequency quenching of the peripheries of both kinds of cams WA1 and WA2 of the camshaft WA formed with the cams for the intake side WA1 and the cams for the exhaust side WA2 which have different phases by 120 degrees. It comprises: three heating coils for the intake side 110 with a circular heating conductor 111 to heat the peripheries of the cams for the intake side WA1; two heating coils for the exhaust side 120 with a circular heating conductor 121 to heat the peripheries of the cams for the exhaust side WA2; a transformer for the intake side 130 to supply electric current to the heating coils for the intake side 110; a transformer for the exhaust side 140 to supply electric current to the heating coils for the exhaust side 120; a driving mechanism 150 to perform revolution of the heating coils 110 and 120 around the center W0 of both cams WA1 and WA2 in a state where the center 111A of the heating conductor 111 of the heating coil for the intake side 110 and the center W0 of the cam for the intake side WA1 are deviated each other, and, in a state where the center 121A of the heating conductor 121 of the heating coil for the exhaust side 120 and the center W0 of the cam for the exhaust side WA2 are deviated each other; and a cooling mechanism (not shown) to cool both heated cams WA1 and WA2.

The three heating coils for the intake side 110 comprises the circular heating conductor 111, and a pair of electricity supply conductors 112 connecting the heating conductor 111 and the transformer for the intake side 130. The three heating coils for the intake side 110 are connected in parallel to one transformer for the intake side 130.

The two heating coil for the exhaust side 120 has the circular heating conductor 121, and a pair of electricity supply conductors 122 connecting the heating conductor 121 and the transformer for the intake side 140. The two heating coils for the exhaust side 120 are connected in parallel to one transformer for the exhaust side 140.

Now, the heating coils for the intake side 110 and the heating coils for the exhaust side 120 are made by bending a pipe of copper and so on. Moreover, they are configured to be provided with cooling liquid circulating in them in order to prevent their own overheating.

Though both heating coils 110, and 120 have almost the same basic configuration, the cams for the intake side WA1 and the cams for the exhaust side WA2 have different dimensions in thickness, as shown in FIG. 6(A). Therefore, the dimensions in width of each heating conductor 111, and 121 are in coincidence with those of cams WA1 and WA2 as each heating object, respectively.

The driving mechanism 150 comprises: a loading stand for the intake side 151 to load the transformer for the intake side 120; a loading stand for the exhaust side 152 to load the transformer for the exhaust side 140; bearings 153, and 154 mounted under the both loading stands 151, 152, respectively; eccentric cams 155, and 156 supported respectively by the bearings 153, and 154; rotation axes 157, and 158 connected to the eccentric cams 155, and 156, respectively; and a driving part 159 to give rotation power to the rotation axis 157, and 158. The centers 155A, and 156A of the eccentric cams 155, and 156 are not in coincidence with the centers 157A, and 158A of the rotation axes 157, and 158, and the centers 157A, and 158A of the rotation axes 157, and 158 are deviated to the outside by the eccentric amount of (r1−r2)/2 of both heating coils 110, and 120. In addition, as the phase of the cam for the exhaust side WA2 is deviated from that of the cam for the intake side WA1 by 120 degrees. The eccentric cams 155, and 156 corresponding to both cams WA1, and WA2 are also deviated in phase by 120 degrees.

For example, the eccentric amount of (r1−r2)/2 of the eccentric cam 155 on a side corresponding to the cam for the intake side WA1 is configured to be equal to r≈(r1−r2)/2 of the radius of the revolution motion of the heating coil for the intake side 110, where the distance between the most outer end A in the farthest position from the center W0 of the cam WA1 and the center W0 of the cam for the intake side WA1 is assumed to be r1, and the distance between the other most outer end on the extension of the straight line connecting both and the center W0 of the cam for the intake side WA1 to be r2. And r of the radius of the revolution motion is preferably not to be fluctuate, but, in real high-frequency quenching, there is some fluctuation.

That is, as the center W0 of the camshaft WA is fixed, as will be described later, there is revolution motion of the heating coil for the intake side 110 around the center W0 of the camshaft WA.

On the other hand, the relation between the heating coil for the exhaust side 110 and the camshaft WA is the same as the one between the heating coil for the intake side 110 and the camshaft WA, except the deviation in phase by 120 degrees.

The driving part 159 comprises: a driving motor (not shown) to drive rotation of the camshaft WA; a pair of timing belts 159A, and 159B to transmit the force of the driving motor to the rotation axes 157, and 158. Therefore, the camshaft WA is driven synchronously with both transformers 130, and 140.

And the driving part 159 drives rotation of the camshaft WA around the center W0 of the camshaft WA, that is, the center W0 of both cams WA1, and WA2, as mentioned above.

In addition, a cooling jacket as a cooling mechanism to spray cooling liquid to both heated cams is arranged in the surrounding of both heating coils 110, and 120, though the is not shown in the drawings. In the above, it is important that supply routes to supply the cooling liquid to the cooling jacket is arranged without interaction in the motion of each part.

Thereby, the high-frequency quenching of the camshaft WA is done with the quenching apparatus for simultaneous operation of multiple cams 100 as follows:

The camshaft WA is set into the driving part 159 so that the cam for the intake side WA1 of the camshaft WA is located in the inside of the heating conductor 111 of the heating coil for the intake side 110, and the cam for the exhaust side WA2 of the camshaft WA in the inside of the heating conductor 121 of the heating coil for the exhaust side 120.

Figure 8:
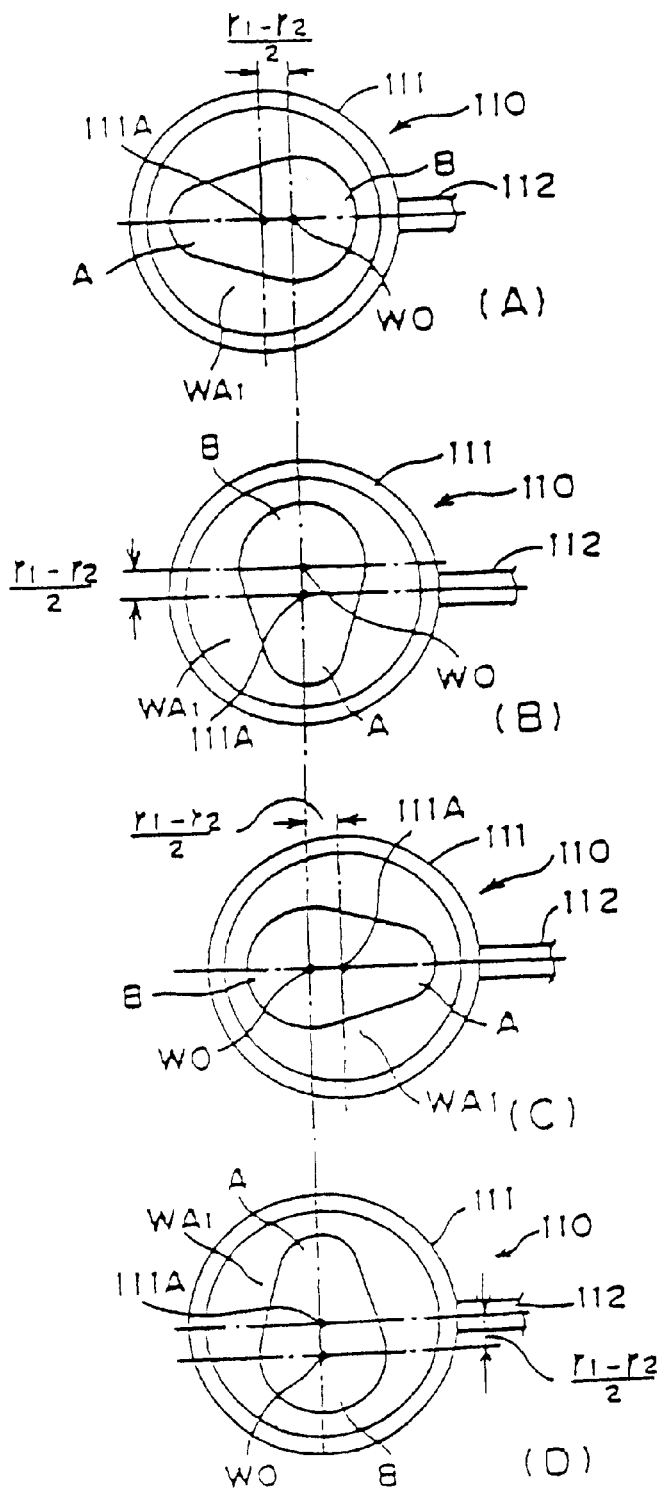
FIG. 8 shows a view of position relations between a pair of a heating coil and cam of the quenching apparatus for simultaneous operation of multiple cams shown in FIG. 6.
Figure 9:
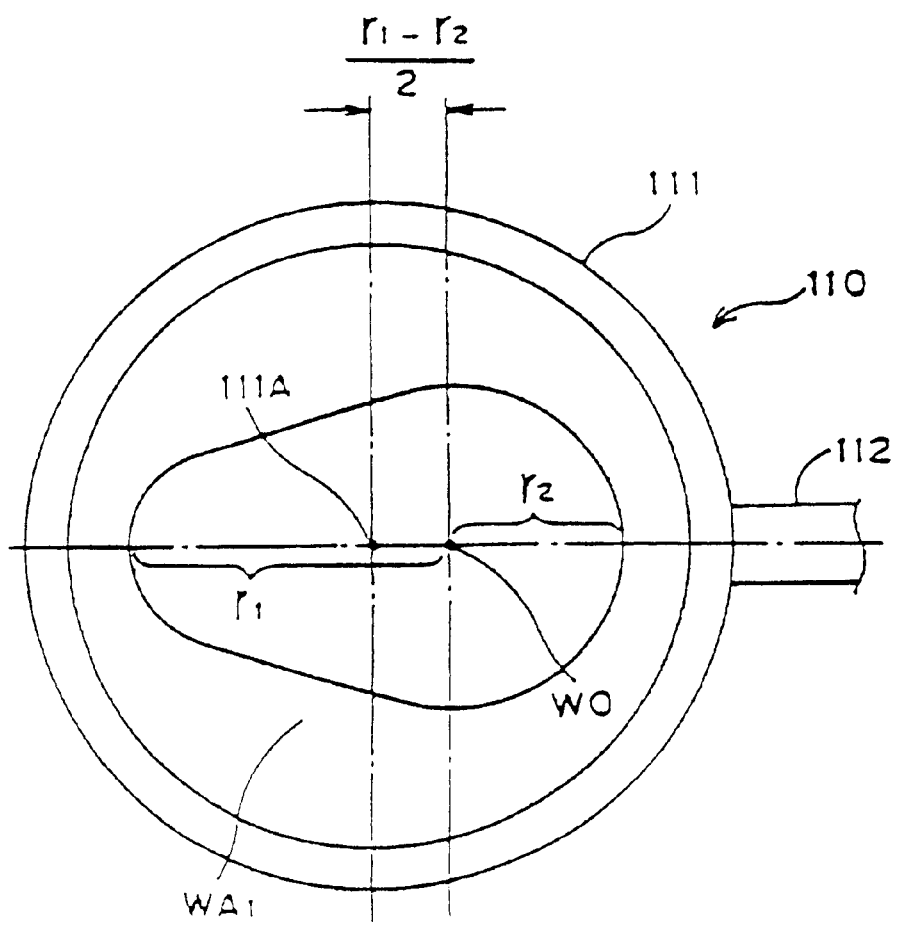
FIG. 9 shows a view of a relation between a pair of a heating coil and cam of the quenching apparatus for simultaneous operation of multiple cams shown in FIG. 6.
Figure 10:
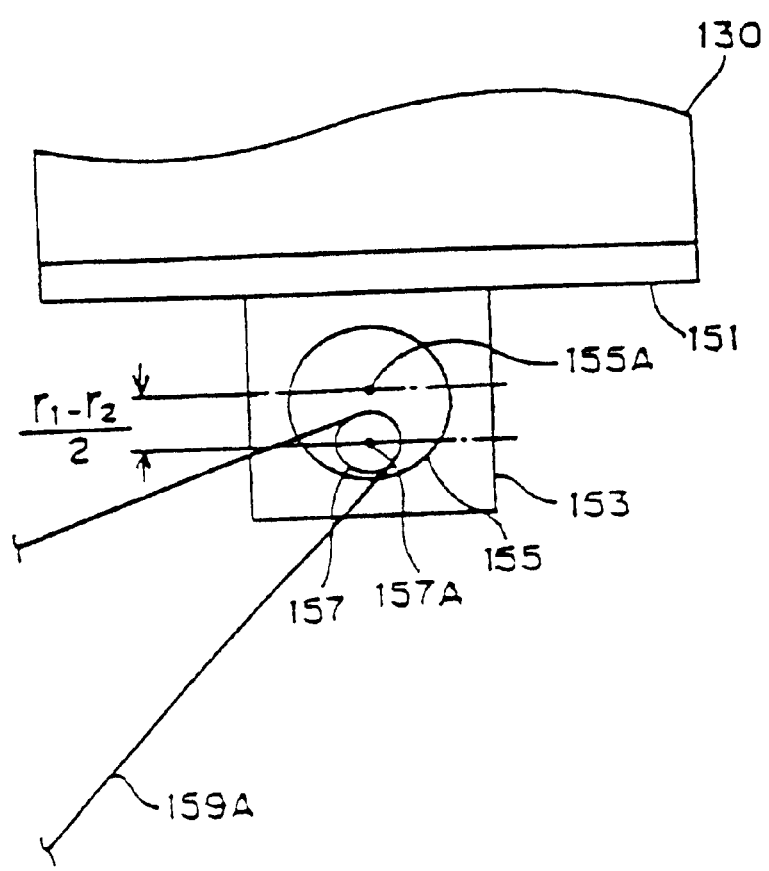
FIG. 10 shows a view of a motion mechanism of the quenching apparatus for simultaneous operation of multiple cams shown in FIG. 6.

In this state, the both transformers 130, and 140 supply high-frequency electric current to the both heating coils 110, and 120, respectively. Moreover, the driving motor of the driving part 159 is driven at the same time to rotate the camshaft WA around the own center W0. The force of the driving motor is transmitted to the rotation axes 157, and 158 through the timing belts 159A, and 159B, respectively. Thereby, the loading stand for the intake side 151 and the one for the exhaust side 152 under revolution motion are moved by the rotation axes 157, and 158, as shown in FIG. 8. That is, both loading stands 151, and 152 perform circle motion with a radius r≈(r1−r2)/2, while they are moved with deviation in phase by 120 degrees between their motions.

As both heating coils 110, and 120 are mounted on both transformers 130, and 140 loaded on both loading stands 151, and 152, both coils 110 and 120 perform similar circular motion. For example, the heating coil for the intake side 110 to heat the cam for the intake side WA1 performs revolution motion with a radius r≈(r1−r2)/2 around the center W0 of the camshaft WA, that is, the center W0 of the cam for the intake side WA1.

Specifically, the heating coil for the intake side 110 is moved as shown in FIG. 8.

As shown in FIG. 8(A), the center W0 of the cam for the intake side WA1 is deviated in a direction of θ degree by (r1−r2)/2 from the center 111A of the heating conductor 111 of the heating coil for the intake side 110, when the most outer end A of the cam for the intake side WA1 is at a position of 180 degrees.

The center W0 of the cam for the intake side WA1 is deviated in a direction of 90 degrees by (r1−r2)/2 from the center 111A of the heating conductor 111 of the heating coil for the intake side 110, when the camshaft WA is rotated counterclockwise by 90 degrees, that is, when the most outer end A of the cam for the intake side WA1 is at a position of 270 degrees as shown in FIG. 8(B).

And, the center W0 of the cam for the intake side WA1 is deviated in a direction of 180 degrees by (r1−r2)/2 from the center 111A of the heating conductor 111 of the heating coil for the intake side 110, when the camshaft WA is rotated counterclockwise by 90 degrees, that is, when the most outer end A of the cam for the intake side WA1 is at a position of θ degree as shown in FIG. 3(C).

Further, the center W0 of the cam for the intake side WA1 is deviated in a direction of 270 degrees by (r1−r2)/2 from the center 111A of the heating conductor 111 of the heating coil for the intake side 110, when the camshaft WA is rotated counterclockwise by 90 degrees, that is, when the most outer end A of the cam for the intake side WA1 is at a position of 90 degrees as shown in FIG. 3(D).

That is, the above shows that the heating coil for the intake side 110 has performed revolution motion with a radius of (r1−r2)/2 around the center W0 of the cam for the intake side WA1.

As the distance between the heating conductor 111 of the cam for the intake side WA1 and the most outer end A of the heating coil for the intake side 110 is configured to be kept almost equal to the distance between the other most outer end B on the extension of the straight line connecting the center W0 and the most outer end A at any time by the revolution motion of the heating coil for the intake side 110, uniform heating of the periphery of the cam for the intake side WA1 is secured.

And, as the case with the cam for the exhaust side WA2 is similar to the case with the cam for the intake side WA1, the distance between the most outer end A of the cam for the exhaust side WA2 and the heating conductor 121 of the coil for the exhaust side 120 is configured to be kept almost equal to the distance between the other most outer end B and the heating conductor 121. Thereby, uniform heating of the periphery of the cam for the exhaust side WA2 is secured.

After predetermined heating, the cooling liquid is sprayed from the cooling jacket (not shown) to perform high-frequency quenching of both cams WA1 and WA2.

As the hardened layer formed on, for example, the most outer end A of the cam for the intake side WA1 has almost the same depth as the one formed on other parts by the high-frequency quenching, there is neither distortion nor quenching crack which has been conventionally a problem.

Figure 12:
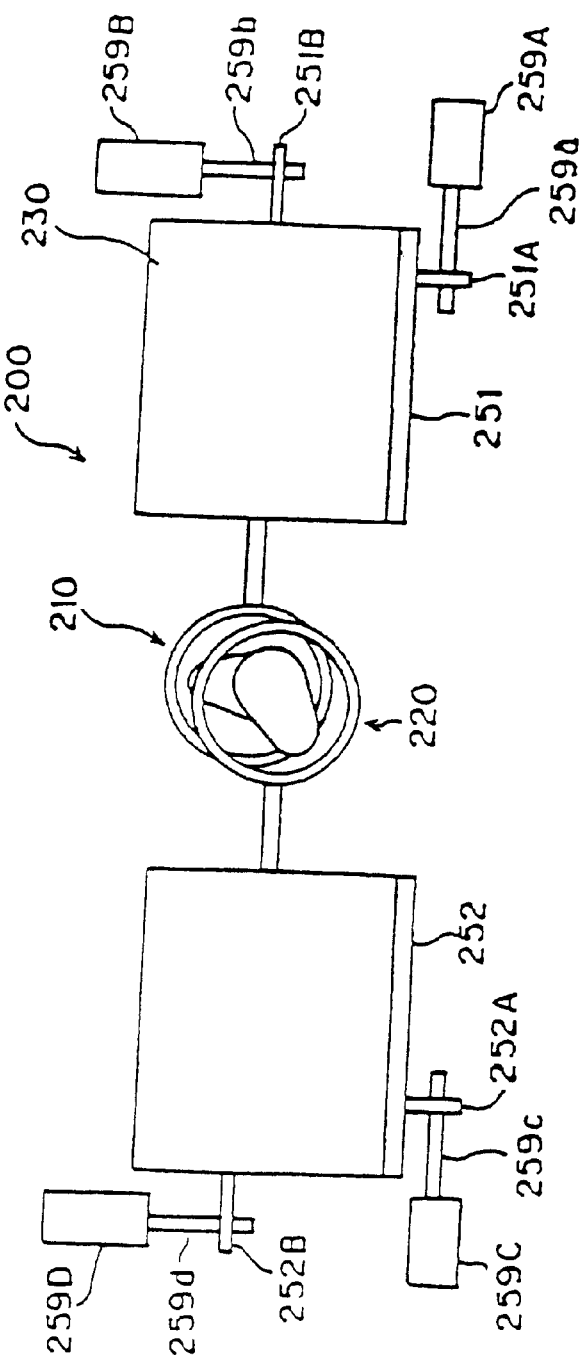
FIG. 12 shows a schematic side view of a quenching apparatus for simultaneous operation of multiple cams according to another embodiment of the present invention.

Moreover, though revolution motion of both heating coils 110, and 120 is performed by force from the driving motor to drive rotation of the camshaft W in the first embodiments, the revolution motion may be performed by four independent servomotors 259A, 259B, 259C and 259D instead of the driving motor, as shown in FIG. 12.

In a quenching apparatus for simultaneous operation of multiple cams 200 according to the embodiment, a crosswise (right-left direction) guide 251A is provided under the bottom of the loading stand for the intake side 251 loading the transformer for the intake side 230; and a longitudinal (up-down direction) guide 251B is provided at the side of the transformer for the intake side 230, respectively; moreover, two servomotors 259A and 259B fitted with feed screws 259a and 259b corresponding to each direction. That is, the same revolution motion as the revolution motion of the quenching apparatus for simultaneous operation of multiple cams 100 may be configured to be performed by enabling motion of the loading stand for the intake side 251 in two directions perpendicularly intersecting each other.

In such a case, it is needless to say that a driving mechanism, which uses the heating coil for the exhaust side 220, the two similar servomotors 259C and 259D, the feed screws 259c and 259c driven by the servomotors 259C and 259D, the guides 252A and 252B corresponding to the feed screws 259c and 259c, and so on, is required to be provided.

Thus, the driving part using the servomotors 259A, 259B, 259C, 259D may relatively easily change tracks of revolution motion of the both heating coils 210, and 220, only by changing control signals to control the driving of the servomotors 259A, 259B, 259C and 259D. That is, when mechanical parts such as the eccentric cams 155, and 156, the timing belts 159A, and 159B, and so on are used, exchanging of parts such as the eccentric cams 155 and 156, and some time for the exchanging are required in order to change tracks of the revolution motion after change of the camshaft W. And there is an effect where the changing becomes easier, as only changing of control signals is required to reduce the changing time.

Figure 11:
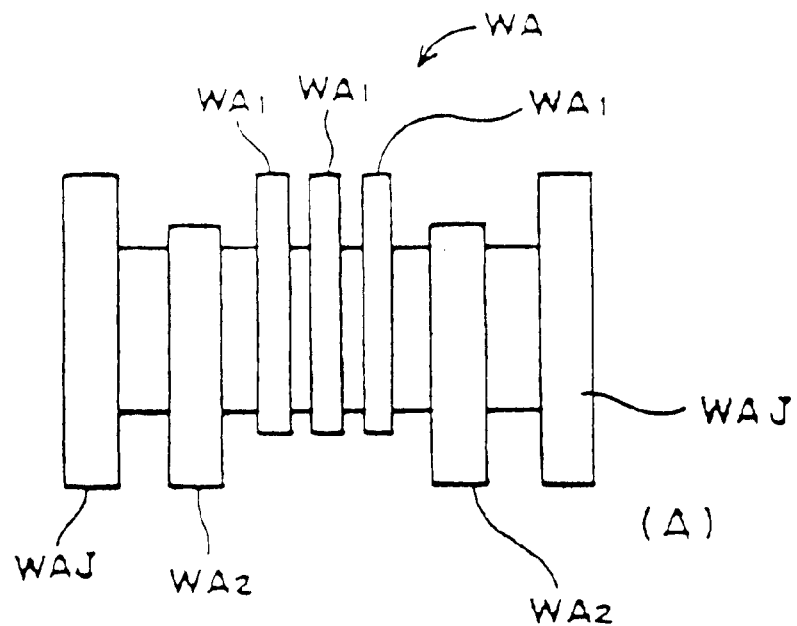
FIG. 11 shows a schematic view of a camshaft which is provided with cams being objects of high-frequency quenching operation by the quenching apparatus for simultaneous operation of multiple cams shown in FIG. 6.
Figure 11:
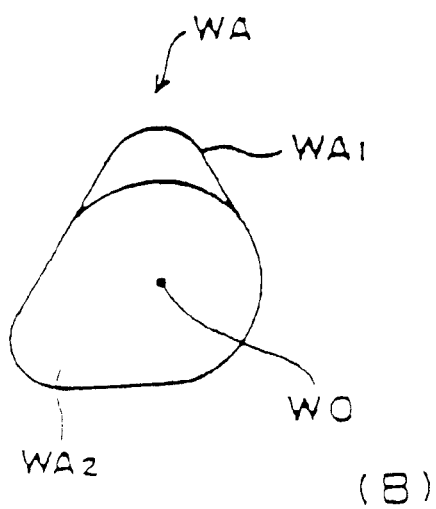

A camshaft WB shown in FIGS. 14(A) and (B) may be used as a camshaft, instead of the one shown in FIG. 11. The camshaft WB comprises four kinds of cams, that is, two sets of cams for the intake side WB1, and WB3, and two sets of cams for the exhaust side WB2, and WB4. First cams for the exhaust side WB2 are arranged at both sides of a first cam for the intake side WB1, and second cams for the exhaust side WB4 at both sides of a first cam for the intake side WB3, respectively. Moreover, there is a similar configuration to that of WA, where each cam for the intake side WB 1 and WB3 comprises three cams, and each cam for the exhaust side WB2 and WB4 comprises two cams But, the phases of four sets of cams WB1, WB2, WB3, and WB4 are different respectively in phase.

In a quenching apparatus for simultaneous operation of multiple cams 300 to perform high-frequency quenching of the four sets of cams of the camshaft WB, two quenching apparatuses for simultaneous operation of multiple cams 100 basically mentioned above are configured to be provided in parallel, as shown in FIG. 14(C). That is, the reason is that the camshaft WB comprises four sets of cams, WB1, WB2, WB3, and WB 4 with each different phase, and has a basically same configuration as that of the camshaft WA comprising two sets of cams WA1 and WA2 with different phases.

In the quenching apparatus for simultaneous operation of multiple cams according to the embodiment, high-frequency electric current is supplied from the first transformer for the intake side 130A to three first heating coil for the intake side 110A to heat the first cam for the intake side WB1; from the second transformer for the intake side 130B to three second heating coil for the intake side 110B to heat the second cam for the intake side WB3; from the first transformer for the exhaust side 140A to two first heating coil for the exhaust side 120A to heat the first cam for the exhaust side WB2; and from the second transformer for the exhaust side 140A to two first heating coil for the exhaust side 120A to heat the second cam for the exhaust side WB4, respectively. That is, the high-frequency electric current is configured to be supplied from the same transformers to the heating coils to heat the cams with the same phases.

In even the quenching apparatus for simultaneous operation of multiple cams 300, each heating coil 110A and 110B, and so on is configured to perform revolution motion with a radius $r \approx (r1-r2)/2$ around the center W0 of the camshaft WB in a similar way to the case, when the distance between the most outer end in the farthest position from the center of each cam and the center of the cam is assumed to be r1, and the distance between the other most outer end on the extension of the straight line connecting both and the center of the cam to be r2. And a camshaft WC shown in FIGS. 15(A) and (B) may be used as a camshaft. The camshaft WC comprises four kinds of cams in total, that is, two sets of cams for the intake side WC1, and WC3, and two sets of cams for the exhaust side WC2 and WC4. The first cams for the exhaust side WC2 are arranged at both sides of the first cam for the intake side WC1; and second cams for the exhaust side WC4 at both sides of a second cam for the intake side WC3, respectively. Moreover, each cam for the intake side WC1 and WC3 comprises three cams, and each cam for the intake side WC2 and WC4 comprises two cams, in a similar way to that of the camshaft WA. Further, the phase of the first cam WC2 for the exhaust side is in coincidence with that of the second cam for the intake side WC3, and that of the remaining first cam for the intake side WC1 is different from that of the second cam for the exhaust side WC4.

That is, in the case of the camshaft WC, there are four kinds of cams and three kinds of phases.

An important feature of the quenching apparatus for simultaneous operation of multiple cams 400 to perform high-frequency quenching of four sets of cams WC1, WC2, WC3, and WC4 of the camshaft WC is that high-frequency electric current is supplied from the same transformer to the high-frequency heating coils to heat cams with the same phases. Thereby, high-frequency electric current is supplied from the first transformer 451 to the heating coil 430 to heat the first cam for the exhaust side WC2, and to the heating coil 420 to heat the second cam for the intake side WC3; from the second transformer 452 to the heating coil 410 to heat the first cam for the intake side WC1; and from the third transformer 453 to the heating coil to heat the second cam for the exhaust side WC4, respectively.

However, there is a problem that there is a difference in heat mass between the first cam for the exhaust side WC2 and the second cam for the intake side WC3, as the dimensions in thickness are different each other, as shown in FIG. 15(A). That is, when a same amount of induction current by the high-frequency electric current is generated on materials with each different heat mass, a deeper hardened layer is formed on a material with smaller heat mass and it is impossible to have uniform hardened layers on the both, respectively Therefore, the same amount of high-frequency electric current should not be given to the heating coil 430 to heat the first cam for the exhaust side WC2, and the heating coil 420 to heat the second cam for the intake side WC3 in order to form hardened layers with the same thickness on both. Smaller amount of current should be supplied to the heating coil 420 to heat the second cam for the intake side WC3 with thinner thickness, than that of the current to the heating coil 430 to heat the first cam for the exhaust side WC2.

In order to solve the problems, the following techniques will be described. For example, an inductor is inserted between the transformer 451 and the heating coil 420 to heat the thinner second cam for the intake side WC3 to reduce the electric power for heating. Or, a gap between the heating conductor of the heating coil 420 to heat the thinner second cam for the intake side WC3, and the second cam for the intake side WC3 may be made larger. Or, the number of coil turns of the heating coil 420 to heat the second cam for the intake side may be reduced. Furthermore, a core is provided into the heating conductor of the heating coil 420 to heat the thin second cam for the intake side WC3. But, the techniques should be properly selected according to various kinds of conditions.

Figure 13:
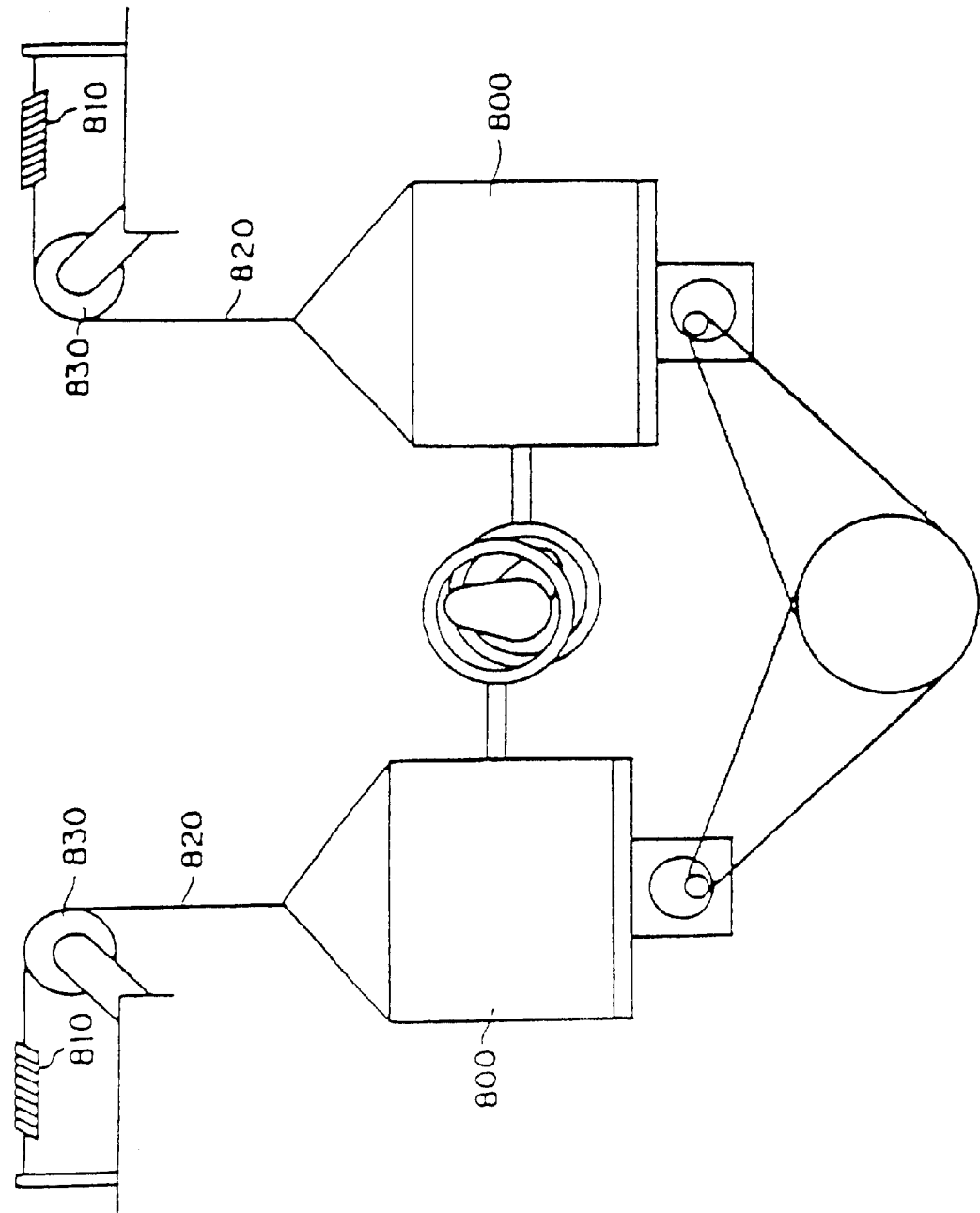
FIG. 13 shows a schematic side view of the quenching apparatus for simultaneous operation of multiple cams shown in FIG. 12.
Figure 14:
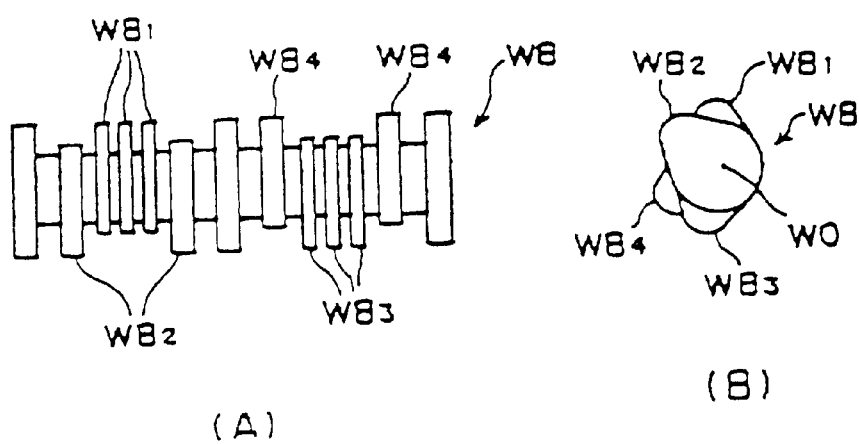
FIG. 14 shows views of a quenching apparatus for simultaneous operation of multiple cams according to further another embodiment of the present invention, and a camshaft which is provided with cams being objects of high-frequency quenching operation by the quenching apparatus for simultaneous operation of multiple cams.
Figure 14:
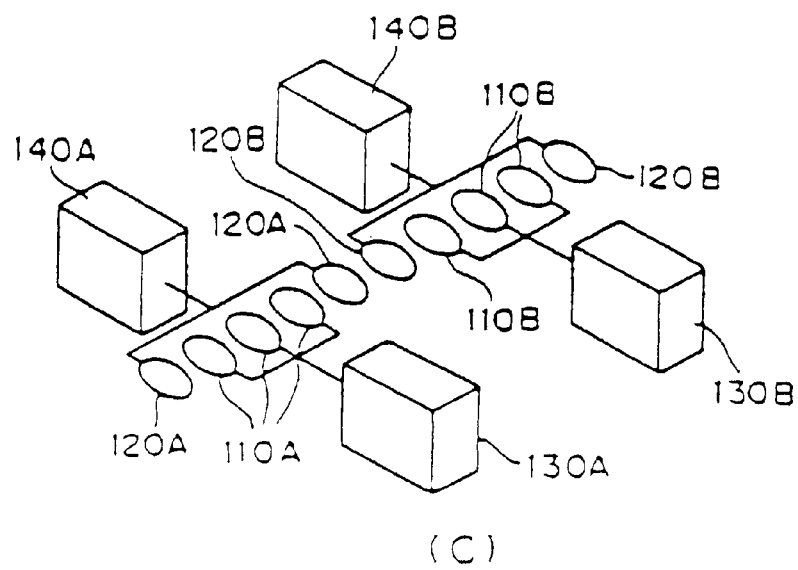
Figure 15:
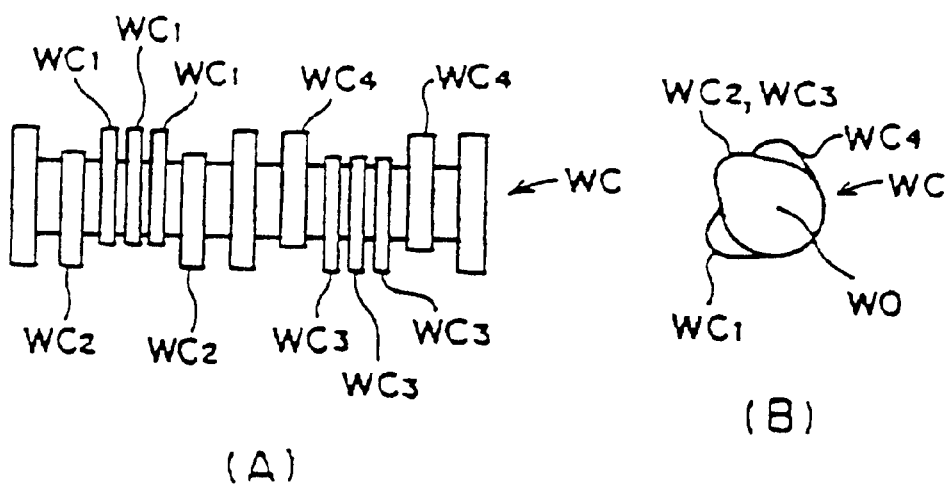
FIG. 15 shows views of a quenching apparatus for simultaneous operation of multiple cams according to still further another embodiment of the present invention, and a camshaft which is provided with cams being objects of high-frequency quenching operation by the quenching apparatus for simultaneous operation of multiple cams.
Figure 15:
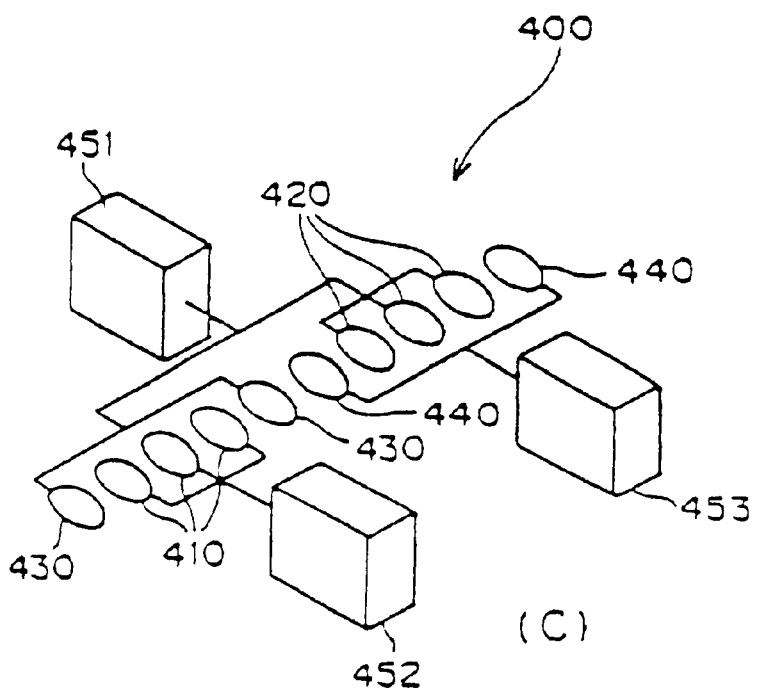

Moreover, it may be also possible to assist the revolution motion of the transformer, which forms a quenching apparatus for simultaneous operation of multiple cams, of a heavy article, further, of the heating coil by hanging a transformer 800 from the upward, using a rope 820 through a spring 810, as shown in FIG. 13. In the drawing, 830 denotes a pulley, and a quenching apparatus for simultaneous operation of multiple cams has the same basic configuration as that of the quenching apparatus for simultaneous operation of multiple cams according to the first embodiment. However, it is clear that the type to assist the revolution motion of the heating coil is not limited to the configuration of the quenching apparatus for simultaneous operation of multiple cams by hanging the transformer 800.

Though the cooling mechanism is configured to be a cooling jacket to spray cooling liquid in each embodiment mentioned above, the cooling liquid may be sprayed from the opening, after provision of openings at each heating coil. And the radius of the revolution motion of the heating coil and so on may be properly set.

In the case of a heating apparatus of a workpiece of distorted shape according to the claims 1 and 2 of the present invention, it may be possible to perform high-quality heating by more uniform heating of the outer surface of the workpiece of distorted shape, than that of a conventional one, as the most outer end of the workpiece of distorted shape is configured to be not more excessively heated, than other parts, during relative rotation of the workpiece of distorted shape arranged at almost the center position of the heating coil.

In the case of a heating apparatus of a workpiece of distorted shape according to the claim 3 of the present invention, there are advantages that the efficiency is high, and time for high-frequency quenching is reduced, as a potbelly type coil is configured to be used as the heating coil, and all over the periphery is heated, always facing with the potbelly type coil during rotation of the workpiece of distorted shape. Moreover, the most outer end of the workpiece of distorted shape is not excessively heated.

In the case of a heating apparatus of a workpiece of distorted shape according to the claims 4 and 5 of the present invention, the distance between the periphery of the workpiece of distorted shape and the circular coil is uniform all over the periphery of the workpiece of distorted shape, and, consequently, the periphery of the workpiece of distorted shape may be uniformly heated, as the workpiece of distorted shape is configured to be rotated and at the same time to perform relative revolution motion to a circular coil. Therefore, high-quality heating may be possible without causing either distortion or quenching crack, different from a conventional one.

A quenching apparatus for simultaneous operation of multiple cams according to the present invention performs simultaneous high-frequency quenching of the peripheries of different kinds of cams with each different phase formed on a camshaft, and a heating conductor to heat the peripheries of the cams comprises a plurality of circular heating coil, a transformer to supply current to the coil, a driving mechanism to perform revolution motion of the heating coil in a state with the center of the heating conductor of the heating coil deviated from the center of the cam, and a cooling mechanism to cool the heated cams. Moreover, current is configured to be supplied to the heating coils with the same phase.

As the most outer ends, which are most projecting, of a plurality of kinds of cams with each different phase may have similar hardened layers to those of other parts by the quenching apparatus for simultaneous operation of multiple cams, it may be possible to perform best high-frequency quenching of each cam.

It may be surely possible to form almost similar hardened layer for the most outer end, which is most projecting among a plurality of kinds of cams with each different phase, to that of other parts, if the radius of the revolution motion of the heating coil around the center of the cam is configured to be $r \approx (r1-r2)/2$, where the distance between the most outer end in the farthest position from the center of the cam and the center of the cam is assumed to be r1, and the distance between the other most outer end on the extension of the straight line connecting both and the center of the cam to be r2.

A quenching method for simultaneous operation of multiple cams has similar advantages to those of said quenching apparatus for simultaneous operation of multiple cams.

What is claimed is:

1. A heating apparatus for a workpiece of distorted shape adapted to perform relative rotation of a workpiece of distorted shape arranged at a center position of a heating coil and to heat a periphery of said workpiece by said coil during the rotation, comprising a detector of an angle of rotation to detect a relative angle of rotation of said workpiece of distorted shape, and an electric power control part to control electric power to be supplied to said heating coil according to the detection results of said detector of an angle of rotation so that the most outer end at the farthest position from the center of said workpiece of distorted shape is not excessively heated in comparison with other parts.

2. The heating apparatus for a workpiece of distorted shape according to claim 1, wherein if a relative angle of rotation of said workpiece of distorted shape is within a predetermined range around a standard angle as a center, said electric power control part is configured to minimize the electric power to be supplied to said heating coil, when said heating coil is a semi-open or semicircular coil, and a relative angle of rotation of said workpiece of distorted shape is assumed to be said standard angle, in a state where the most outer end of said workpiece of distorted shape is facing said semi-open or semicircular coil and located on the perpendicular line passing through the center of said coil.

3. The heating apparatus for a workpiece of distorted shape according to claim 2, wherein, if a relative angle of rotation of said workpiece of distorted shape is within a predetermined range around said standard angle as a center, said electric power control part is configured to minimize the electric power to be supplied to said heating coil, when said heating coil is a potbelly coil with a configuration in which a semicircular small-diameter coil part is facing a semicircular small-diameter coil part and they are joined together, and a relative angle of rotation of said workpiece of distorted shape is assumed to be said standard angle, in a state where the most outer end of said workpiece of distorted shape is facing said semicircular small-diameter coil part and located on the perpendicular line passing through the center of said coil part.

4. A heating apparatus for a workpiece of distorted shape adapted to perform rotation of a workpiece of distorted shape arranged at a center position of a circular coil and to heat a periphery of said workpiece by said coil during the rotation, comprising a motion mechanism to perform revolution of said workpiece of distorted shape within said circular coil or revolution of said circular coil around said workpiece of distorted shape, wherein the center of said circular coil and that of said workpiece of distorted shape are deviated from each other, so that the periphery of the said workpiece of distorted shape is uniformly heated.

5. In combination, the heating apparatus for a workpiece of distorted shape according to claim 4 and a workpiece of distorted shape arranged at almost the center position of a circular coil, wherein the radius r of the revolution of said plate cam or said circular coil is configured to be $r \approx (r1-r2)/2$, when said workpiece of distorted shape is a plate cam, the distance between the most outer end in the farthest position from the center of said plate cam and the center of said plate cam is assumed to be r1, and the distance between the other most outer end on the extension of the straight line connecting the both and the center of said plate cam to be r2.

6. A quenching apparatus for simultaneous operation of multiple cams adapted to perform simultaneous high-frequency quenching of peripheries of a plurality of kinds of cams with each different phase formed at a camshaft, having a heating conductor to heat the peripheries of said cams comprising:

a plurality of circular heating coils;

transformers to supply electric current to said heating coils;

a driving mechanism to perform revolution of said heating coils around said cams in a state where the centers of the heating conductors of said heating coils and those of said cams are deviated from each other; and a cooling mechanism to cool the heated cams, wherein electric currents are supplied from the same transformers to said heating coils with the same phase.

7. In combination, the quenching apparatus for simultaneous operation of multiple cams according to claim 6 and multiple cams arranged at almost the center position of a circular coil, wherein the radius r of the revolution of said heating coil around the center of said cam is configured to be $r \approx (r1-r2)/2$, when the distance between the most outer end in the farthest position from the center of said cam and the center of said cam is assumed to be r1, and the distance between the other most outer end on the extension of the straight line connecting the both and the center of said cam to be r2.

8. A quenching method for simultaneous operation of multiple cams to perform heating of peripheries of a plurality of kinds of cams with each different phase formed at a camshaft, comprising heating conductors to heat the peripheries of said cams adapted to perform a revolution motion of said heating coils around said cams in a state where the centers of said heating conductors of a plurality of circular heating coils are deviated from the centers of said cams, and electric currents are supplied from the same transformers to said heating coils with the same phase to heat said cams.

9. The quenching method for simultaneous operation of multiple cams according to claim 8, wherein the radius r of the revolution of said heating coil around the center of said cam is configured to be $r \approx (r1-r2)/2$, when the distance between the most outer end in the farthest position from the center of said cam and the center of said cam is assumed to be r1, and the distance between the other most outer end on the extension of the straight line connecting the both and the center of said cam to be r2.

10. A heating apparatus for a workpiece of distorted shape adapted to perform rotation of a workpiece of distorted shape arranged at a center position of a circular coil and to heat a periphery of said workpiece by said coil during the rotation, comprising a motion mechanism to perform revolution of said workpiece of distorted shape within said circular coil, wherein the center of said circular coil and that of said workpiece of distorted shape are deviated from each other, so that the periphery of the said workpiece of distorted shape is uniformly heated.

11. A heating apparatus for a workpiece of distorted shape adapted to perform rotation of a workpiece of distorted shape arranged at a center position of a circular coil and to heat a periphery of said workpiece by said coil during the rotation, comprising a motion mechanism to perform revolution of said circular coil around said workpiece of distorted shape, wherein the center of said circular coil and that of said workpiece of distorted shape are deviated from each other, so that the periphery of the said workpiece of distorted shape is uniformly heated.

12. A heating apparatus for a workpiece of distorted shape adapted to perform rotation of a workpiece of distorted shape arranged at a center position of a circular coil and to heat a periphery of said workpiece by said coil during the rotation, comprising a motion mechanism to perform revolution of said workpiece of distorted shape within said circular coil and revolution of said circular coil around said workpiece of distorted shape, wherein the center of said circular coil and that of said workpiece of distorted shape are deviated from each other, so that the periphery of the said workpiece of distorted shape is uniformly heated.

* * * * *